United States Patent Office 3,563,659
Patented Feb. 16, 1971

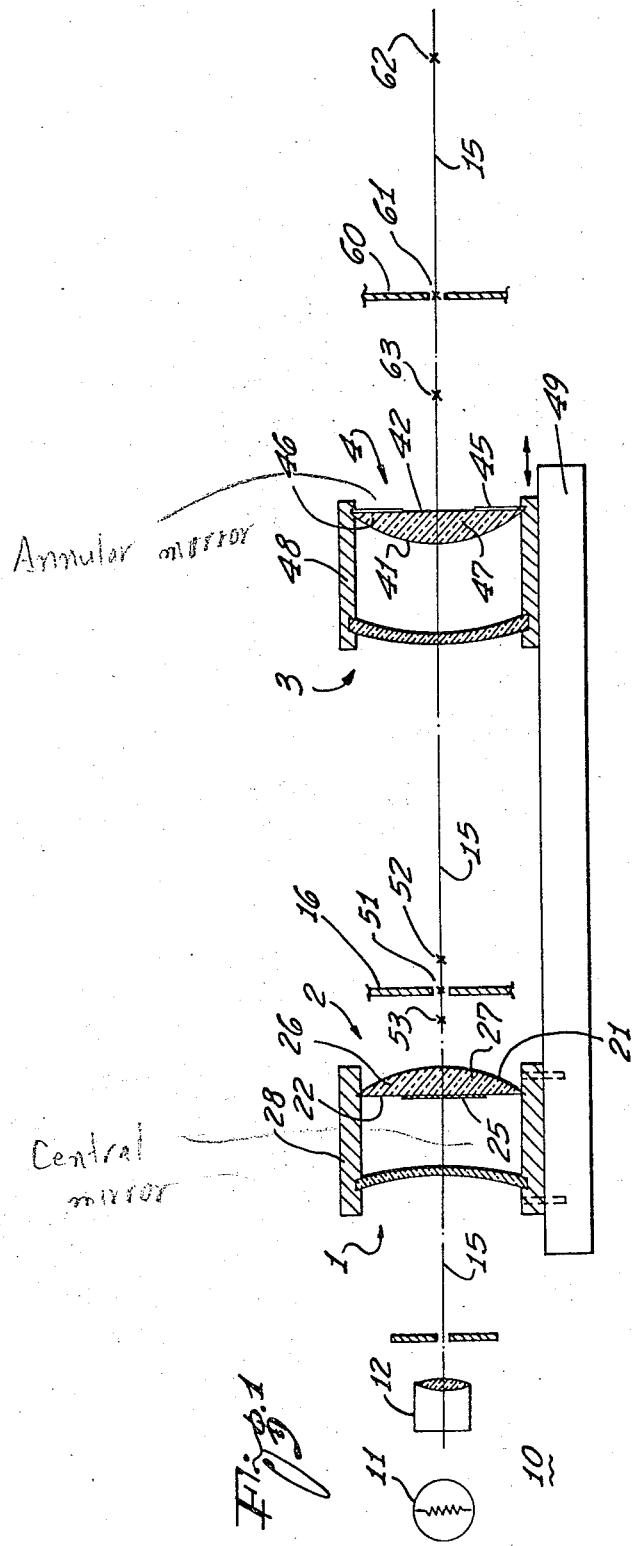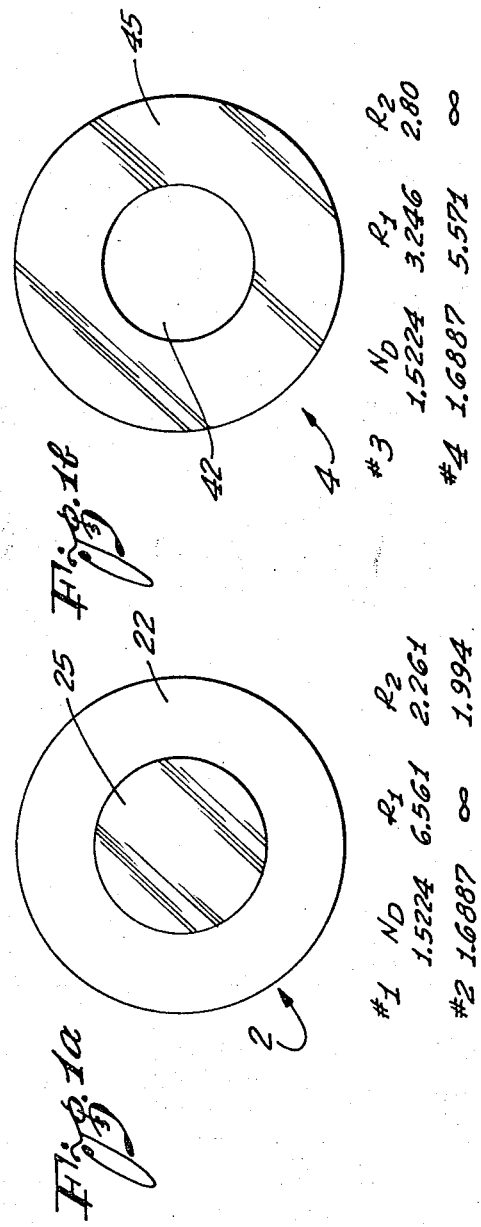

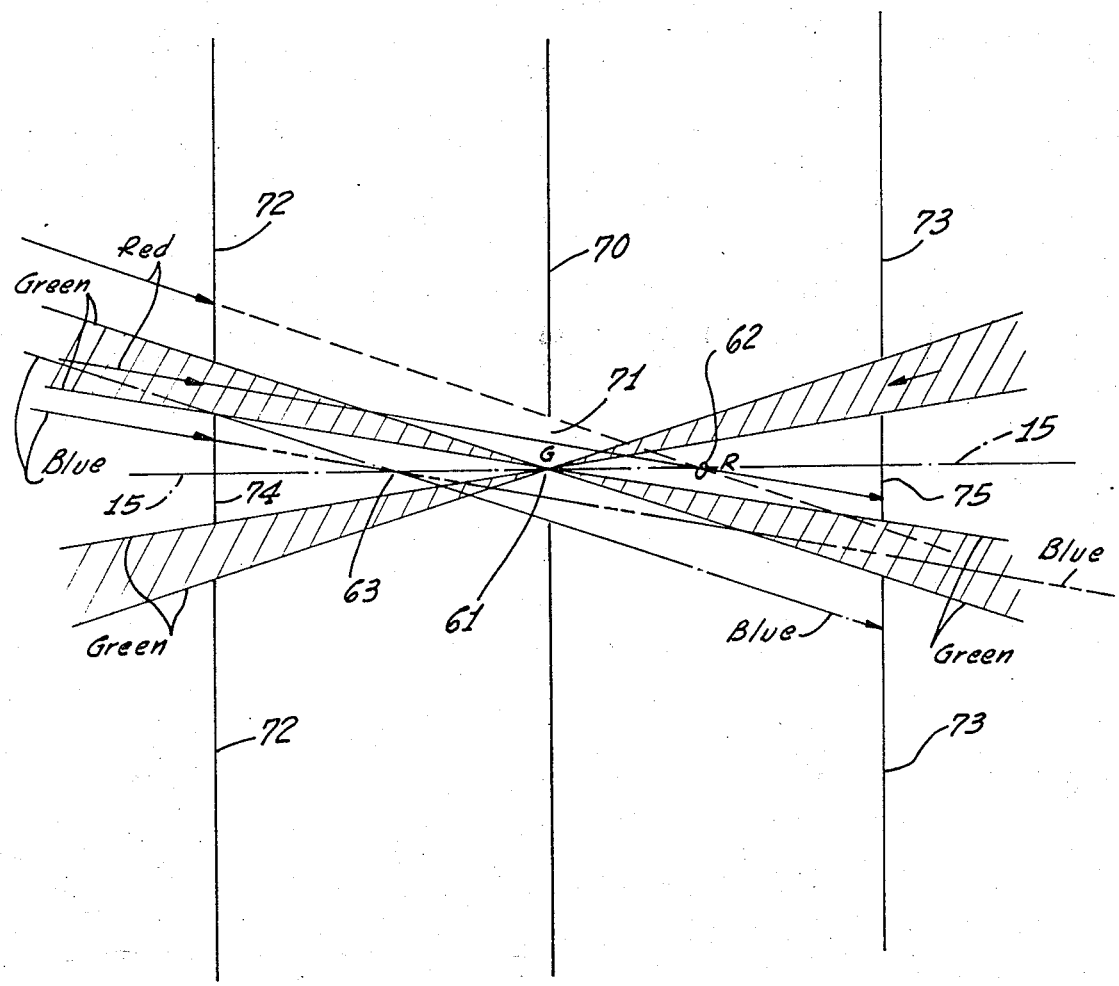

3,563,659
MONOCHROMATOR
James S. Thompson, 10482 Holman Ave.,
Los Angeles, Calif. 90024
Filed Feb. 8, 1968, Ser. No. 704,149
Int. Cl. G01j 3/12
U.S. Cl. 356—99                                    9 Claims

ABSTRACT OF THE DISCLOSURE

A focal isolation monochromator employing the principle of chromatic aberration in that sequential image formations by refraction magnify the spread of image points of different wavelengths as formed by the imaging system along the optical axis and from a heterochromatic light source.

---

The present invention relates to a monochromator of the focal isolation type.

Known focal isolation monochromators use lens elements of the type exhibiting chromatic aberration so that a heterochromatic light source is imaged by such element in several points along the optical axis. Radiation focused in a particular plane can be separated from radiation focused outside thereof by placing a diaphragm in that particular plane. It is an object of the present invention to improve the spectral purity of a monochromator using chromatic aberration of refraction for focal isolation.

In accordance with the invention it is suggested to provide several optical elements exhibiting chromatic aberration along a path from a heterochromatic light source, whereby an optical element positioned, relatively speaking, farther away from the light source provides images of image points produced by an optical element closer to the light source so as to obtain magnification of the separation of image points of differing wavelength. The desired wavelength is separated from the undesired ones by a diaphragm in the focal plane of the final image point. The light path in the vicinity of and along the optical axis and in close proximity thereto, where the refracting elements affect light rays very little, and as extending from the source to the final image points, however, is blocked at least to the extent that light rays remaining or tending to remain in such a light path do not participate in the formation of the final image points.

In the preferred form of practicing the invention, particularly when a change in wavelength is required, it is suggested to use a pair of spherical lenses positioned in relation to a heterochromatic light source, so that radiation from the source as focused by a first one of the two lenses provides a collimated beam between the two lenses, strictly for one wavelength only. The lens receiving the collimated beam has an internally reflecting ring on the surface of the lens facing away from the incoming beam so that the corresponding juxtaposed, ring-shaped lens portion is effective twice as refracting element, once directly for the light forming the collimated beam and again after reflection thereof.

The last mentioned ring portion of the second lens provides a series of image points in the space in between the two lenses. A central portion of the surface of the first lens facing the light source is also provided with a reflecting layer for internal reflection. Thus, the peripheral, also ring-shaped portion of the first lens only provides the above-mentioned collimated beam. The central reflecting surface of the first lens serves as stop for propagation of light from the source into the central axis region between the two lenses and farther. The internal reflecting surface of the first lens observes the image points between the lenses through the central portion of the first lens, reflects the light as propagating beyond the image points, and the same central portion of the first lens refracts this light again. This central reflector directs the light towards the central portion of the second lens which in turn provides a second set of image points spread considerably apart along the optical axis. The isolating diaphragm is positioned in a particular plane which is the final image plane for one particular wavelength. That wavelength changes if, for a stationary diaphragm, the second lens is axially shifted in relation to the first lens. A lens for correction of spherical aberration is preferably associated with each of the first and second lenses. Spectral purity of under 50 angstroms can be obtained.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic section view through an optical system constituting the preferred embodiment for practicing the present invention;

FIGS. 1a and 1b respectively are elevations of the principal lenses used in the system of FIG. 1 and include tables for relevant optical data of a representative example; and FIG. 2 illustrates somewhat schematically a modified diaphragm for effecting focal isolation.

Proceeding now to the detailed description of the drawings, in FIG. 1 thereof, there is illustrated a monochromator in accordance with the preferred embodiment of the present invention. Reference numeral 10 denotes a light source which emits a beam of heterochromatic light. In accordance with an actually used embodiment, the light source is the filament of an incandescent lamp 11 being of the type commonly used in a microscope illuminator. The filament consists of a square array of closely packed tungsten wire so arranged as to present a solid 0.1 inch square area free of voids when viewed normally to this surface. This filament is imaged at a reduction of 40× by a 4 mm. E.F.L. microscope objective 12 of numerical aperture 0.25. The linear dimensions of this image are 0.0025″ by .0025″. This image becomes the "point source" for the monochromator. Thus, the light source is a lamp, together with a focusing system which provides a very short focusing range, so that the source 10 can be regarded as a point source indeed.

This light from the source 10 is directed towards and through an optically active element #1 of the spectacle glass type. This first lens 1 provides correction of the spherical aberration of the optically active element to be described next. The precorrected light bundle is directed to a second lens 2 which has a convex surface 21 and a plane surface 22 facing the light source 10. Lens 2 is positioned so that it can be corrected through the lens 1 as required. The light source 10 is in the focal point of the system composed of elements #1 and #2, which is for practical purposes identical with the focal point of lens 2. Preferably, though not necessarily, source 10 is positioned in the focal point of system #1–#2 for the longest wavelength for which the monochromator is used.

A circular disc-shaped portion of the front wall 22 of lens 2 is provided with a reflective coating, such as an aluminum layer 25. Any resulting reflection of light towards light source 10 is unimportant and may actually be inhibited by an additional, light absorbing layer on the outside of layer 25. It is important, however, that light directly coming from source 10 is stopped by layer 25 from propagating farther, particularly into lens 2 and beyond. The interface between layer 25 and the surface 22 is highly reflective and is the reflection proper established by layer 25. The disc-shaped mirror 25 is disposed concentrical to the optical axis 15 of the lens 20, which is also the optical axis of the entire system.

The lens 2 offers a ring-shaped portion 26 as optically active, i.e., refracting element to the light from source 10. Due to the fact that the source 10 is positioned in the (or one of the) focal point(s) of lens 20, the ring lens 26 provides a tubular light bundle which is a nearly collimated light beam. The central portion 27 of the lens 2 does not participate in the formation of this collimated light beam. At a particular distance from lens 2 to be defined more fully below, a second spherically convex lens 4 is positioned, having a convex surface 41 facing the convex surface 21 of the lens 2. The lens 4 has a planar surface 42 upon which is deposited a ring-shaped layer 45 constituting another reflector. The principal reflecting surface is defined by the interface of layer 45 with the planar rear surface 42 of lens 4. Another negative optical element #3 is positioned in front of lens 4. Lens #3 precorrects the light as to a spherical aberration of element #4.

Elements #1 and #2 are mounted in a fitting 28 which in turn may be secured to a bed 49. Light source 10 is likewise assumed to be mounted to bed 49. Elements #3 and #4 are mounted in a fitting 48 which is slidably positioned in bed 49, the movement, however, being restricted to direction parallel to optical axis of the system. It should be borne in mind that the shape of the bundle of rays passing between elements #2 and #3 looks like a thick-walled cylinder in this region for this portion of the passage. As stated above, the optical system as composed of elements #1 and #2 is adjusted so that the longest wavelength radiation it is desired to have the system transmit is collimated in the space to the right of element #2. Radiation of wavelength longer than this will be somewhat divergent in this space and as a result will miss the second group of optical elements #2 and #4. Consequently, the intensity of radiation when leaving the system finally, and having wavelength longer than the one for which the beam is collimated, will be reduced considerably. However, this collimated condition is not critical: for this configuration where all the lenses are of the same diameter it gives in fact the maximum transmission for a given special resolution of the system.

Radiation of shorter wavelength will be slightly convergent in the space between elements #2 and #3. To prevent the passage of this light through the transmitting portion 47 in the center of the fourth optically active element, this transmitting, central lens portion 47 must have a smaller outside diameter than the diameter of the central reflecting area (25) in lens 2. In other words, the outer diameter of central reflector 25 should be somewhat larger than the inner diameter of ring reflector 45.

As the collimated tubular beam reaches lens 4, it enters essentially only a ring-shaped portion 46 of lens 4, and is refracted in accordance with the curvature of the surface 41 thereat. That portion 46 can also be referred to as a ring lens; its being a portion of lens 4 is not essential in principle, but was found possible and, therefore, very convenient. The refracted light is reflected by ring reflector 45 and refracted again. Hence, lens portion 46 focuses the near collimated beam as if it were a lens with two convex surfaces, each having radius of curvature as has the surface 41, due to the reflection by reflector 45. The ring lens 46 now provides a series of image points of the light source in an area 50. The beam entering ring lens 46 is not completely collimated due to chromatic aberration of lens 2. The chromatic aberration of lens 4 magnifies the spread of the image of source 10 along axis 15 in region 50, in accordance with wavelength, and beyond the chromatic aberration of lens 4 itself (1) due to the fact that the incident beam has an angle varying with wavelength and (2) due to the fact that the ring lens 46 is doubly used for refraction by operation of reflector 45.

As stated, lens 4, as mounted in lens holder 48, is adjustable in bed 49 in either direction along optical axis 15 and as indicated by the double arrow. The focal points (for different wavelengths) as well as image points are, so to speak, carried along upon adjustment of lens 4. It may be assumed that in a first adjustment position the green light is focused by ring lens 46 in point 51 of the focal area 50. Somewhat closer to the lens 3, for example, at or near a point 52, predominantly blue or blue-green or violet light is focused by ring lens 46 and in or near point 53 red or orange light is predominantly focused. These points are image points of representative wavelengths, used only to explain the principle with the understanding that image points for other wavelengths appear in positions in accordance with their wavelengths. The presentation of distance in FIG. 1 between the points 51, 52 and 53 is somewhat exaggerated and is shown primarily for purposes of illustration.

One can say now that a real image of the light source 10 is produced in the focal area 50, but due to the chromatic aberration of lenses 2 and 4 focusing and image reproduction is inherently an incorrect one. The different colors appear in different planes in relation to the lens. The color aberred image is now observed, so to speak, by the reflector 25, through the central portion 27 of lens 2. The light from the real images produced in area 50 is passed through the central portion 27 of lens 2, reflected by mirror 25 and returned as a bundle of light rather close to the optical axis 15. For this refraction, central lens portion 27 is also effective as if it were a lens with two convex surface of the same radius or curvature as has surface 21. The focal points of this central lens portion 27 as effective together with mirror 25, are, of course, different from the focal points of lens 2 when and where effective without the mirror 25.

The central portion of lens 2 exhibits likewise chromatic aberration, so that its focal points differ in accordance with wavelength. It may be assumed presently that for a particularly adjusted position of lens 4 "green image" point 51 thereof is also the focal point for green light of the central lens 27 as modified by the mirror 25. Thus, as green light is focused by ring lens 46 into focal point 51, central lens 27 produces a green collimated beam which propagates towards the central portion 47 of the lens 4. That green radiation component is focused by central lens 47 at a focal point 61, shown to the right of the system. That focal point is accurately defined for green light of particular wavelength and for the particular position of lens 4. Since, as stated, elements 1 and 3 correct the system for spherical aberration, green light is very sharply focused at point 61 indeed.

The heterochromatic light as produced by the source 10 includes also red and blue light. As stated, a red component was focused by ring lens 46, in cooperation with the ring mirror 45, in focal point 53. This, of course, holds true only for a specific wavelength, and we consider presently for convenience of discussion one particular red light wavelength which is longer than the particular green light focused in point 51. Blue light of particular wavelength is focused by ring lens portion 46 of lens 4 in focal point 52.

As was stated above, central lens portion 27 of lens 2 has its focal point for green light coinciding with point 51. It follows, therefore, that a focal point of central lens 27 for a blue light component can be expected to be close to point 53 (in which ring lens 47 focuses red light), while the focal point of central lens 27 for a red light component of the particular wavelength is close to or may even coincide with the point 52 in which ring lens 47 focuses blue light. As a consequence the real, "red light image" of the light source, as provided in point 53, is closer to the lens 2 than the focal point thereof for red light (which is in or near point 52). Therefore, central lens 27 provides a virtual image of the real red image of light source 10, which means that central lens 27 produces a divergent red light beam, representative of a rather close virtual (red) image of the light source. This virtual image is the obect for the lens portion 47 producing a real image thereof at point 62 at a rather long distance to the right of point 61. Point 61 is the focal point of central lens 47 for green light, coinciding with a green image point, as the green beam between central lenses 27 and 28 was collimated. However, red image point 62 is farther from point 61 than the focal point of lens 47 for the same red wavelength.

The blue light focused by the ring lens 46 in point 52 is farther away from the focal point 53 of the lens mirror system 27–25 for blue light. Hence, lens mirror system 27–25 tends to produce a real (blue) image along axis 15. However, that converging beam is intercepted by the central portion 47 of lens 4 producing now a real image considerably closer to lens 4 than point 61, say at point 63. In particular, image point 63 for the blue image is much farther from image point 61, than the focal point of lens 47 itself for blue light.

One can see, therefore, that the optical system provides for very distinct separation of image points of heterochromatic light, in that the normal focal isolation inherent in a normal spherical lens is greatly magnified by operation of the system. The chromatic aberration presented by each of the positive refractions is magnified extensively, and by mutual cooperation an additional contribution is made to this aberration.

A diaphragm 60 in the plane of focal point 61 with an aperture of less than 1 millimeter blocks the diverging red and orange-yellow light from further propagation. The spacing of image point 63 for blue light from point 61 results also in a diverging beam of blue light to right of the image point 63 which, again, is intercepted by diaphragms 60 and blocked from further propagation. The diaphragm 60 can be an opaque disk with a single aperture as shown in FIG. 1, or it can be an arrangement such as shown in FIG. 2. The figure shows three diaphragm elements with element 70 corresponding to element 60 in FIG. 1. Elements 72 and 73 block, additionally, blue and red components, or, better, components not focused in the plane of element 70 are blocked by diaphragm elements 72 and 73 so as to enhance spectral purity of the light output to the right of FIG. 2.

The green light is focused in the plane of diaphragm 70 and in aperture 71 thereof. The diaphragm 72 provides some restriction as to the cone of light rays having its apex in focal or image point 61. A central stop 74 blocks the interior of the cone from reaching the similar size diaphragm 73 with central stop 75 as disposed on the other side of diaphragm 70. The hatched area defined the bundle of green light ultimately leaving the system to the right of arrangement 73–75. The loss in intensity resulting from stops 74 and 75 is the penalty paid for spectral purity.

Blue light attempted by the system to be focused in point 63 is either blocked by stop 74 or, if permitted to pass through the ring aperture between elements 72 and 74, will be blocked by diaphragm 73. Red light attempted by the system to be focused in point 62 will be blocked by diaphragm 72 or stop 74, and, if permitted to pass through the ring aperture between elements 72 and 74, stop 75 impedes further propagation. Light permitted to propagate beyond elements 73–75 must have a wavelength, such that it is focused in a range around point 61 defined as follows. As to longer wavelengths, the focal point of lens 47 must not be farther from point 61 than the intersection of a ray tangent on diaphragm 72 and stop 75 where intersecting axis 15. As to shorter wavelengths, the focal point of lens 47 must not be farther from point 61 on the other side thereof, than the ray tangent on stop 74 and diaphragm 73. This readily illustrates that aperture size of various openings determines spectral purity of the beam leaving the system.

For the dimensions shown for the system in FIG. 1 the diaphragm system shown in FIG. 2 will increase the spectral purity to about 25 angstroms line width at the expense of yielding about half as much power at a particular wavelength. This is caused by vignetting of the "off axis" rays of the radiation that is precisely focused in the plane of the diaphragm 70. While such an arrangement is rather difficult to adjust, it is felt that in some circumstances the complication is warranted and proves of significant value. It should be mentioned that the transmission of the system for wavelengths longer or shorter than the operating transmission band is zero due to the fact that the central part of the ray cone is missing.

It is an important feature that the heterochromatic axial rays in or close to the optical axis 15 from light source 10 are blocked by the mirror 25 from propagation, so that the light at focal point 61 as confined by the diaphragm 60 is monochromatic. Experiments have shown that a spectrum line can be produced with a width of 100 A. and less, even without using the diaphragm system shown in FIG. 2. Upon positioning a diaphragm 16 near the "internal" focal area 50 of the system, spectral purity can be enhanced.

Upon moving lens group 3 and 4 in bed 49 in either direction the system of focal points 51, 52 and 53 very nearly follows the displacement of lens 4. Therefore, for a different position of lens 4 the focusing image point 52 for the blue light will be positioned so that the central lens portions 27 and 47 together cause focusing of the blue light in point 61 of the plane of diaphragm 60 (or 70). Conversely, if lens group 3 and 4 is caused to recede from lens 2, the (red) image point 53 will, in a particular displacement position, be imaged by lens portions 27 and 47 into point 61. It follows, therefore, that by movement of the elements 3 and 4 in relation to the lens 2, the wavelength of the light focused in point 61 and not blocked by diaphragm 60, varies. Accordingly, the position adjustment of lens 4 determines the wavelength of the spectrum line which serves as output of the monochromator system as monochromatic light beam to the right of the aperture of diaphragm 60 or 70 and at a resolution of 100 angstroms and below. Essentially, the entire range of visible light can be covered by appropriate adjustment of holder 48 in this manner. For this particular arrangement shown in FIG. 1, a displacement of about 1.3″ of the second lens group caused the system to shift the wavelength of the radiation focused at point 61 from 4000 A. to 7000 A. Thus, with this configuration of optical elements, the selection of wavelength is accomplished by a comparatively crude mechanical adjustment.

When the light reflected by reflector 25 is collimated in its passage toward elements 3 and 4 (for the longest wavelengths), the overall magnification of the system for the filament image formed by the microscope objective is 4×. Since the image formed by the microscope objective is 0.0025″ square, the image formed at the diaphragm system 60 or 70 is 0.010″ square. The diameter of the transmitting hole in the diaphragm is assumed to be 0.020″. The reason for this is to make the adjustment of the reflecting elements less critical. With the diaphragm thus opened up, spectral purity of the system was found to be 50 angstroms and to be set as much or more by the lack of optical quality in the spectacle lenses. The design goal of the system shown in FIG. 1 originally was to have been 100 angstroms resolution.

By placing two such systems back to back and causing the movable elements to move in opposite directions, the spectral purity of the system will be about 5 angstroms. The system as described, can be used as output coupler for a laser, particularly for eliminating undesired modes. The spectral line width of the monochromator system as described is readily smaller than the mode separation of a laser modulated at the cavity fundamental. A single mode can thus readily be coupled out of the laser by means of such a monochromator. With high efficiency dielectric anti-reflected coatings on the transmitting surfaces, the monochromator system will have an overall transmission for the radiation accepted by the first lens group (elements #1 and 2) in excess of 50% if the glasses indicated in FIG. 1 are used.

The function of the negative elements #1 and 3 is to control the spherical aberration of the system. If the spherical aberration is not corrected the diaphragm system must be opened up to get a reasonable transmission at each wavelength, thereby allowing nearby wavelength radiation to pass through the system. The spectral resolution would be reduced accordingly.

The manner of adjusting elements #1 and 3 to eliminate the spherical aberration is described next. This adjustment must be carried out using reasonably monochromatic radiation preferably in the midrange of the wavelength spread for which the system is designed. This midrange value should be the average, not of the wavelength itself, but for the effective refractive index spread of the glass employed for elements #2 and 4. For the particular system disclosed an appropriate value would be 4900 angstroms selected as the midpoint setting of lens 4. This will balance the spherochromatism of the two extremes.

It is possible to make these adjustments with the required accuracy using a Wratten gelatin filter and an incandescent source, but if a laser of nearly the proper wavelength is available it will yield much more accurate results.

The manner of adjusting the spacing of the negative elements #1 and 3 is to place element #1 in the system first particularly in relation to element #2 and omit element #3. By adjusting the axial position of element #1 and the position of the light source 10 to maintain the collimated condition to the right of element #2 it will be possible to bring the outermost and innermost rays to the same focal point. The intermediate, or zonal rays, will be found to be afflicted with large positive spherical aberration.

Now lens element #3 is inserted in holder 48. From here on lens elements #3 and 4 move as a unit. The spacing between elements #2 and 3 is now readjusted so that the light leaving lens 2 after reflection from the central metallized area 25 of this element #2 is again nearly collimated as it passes to the right. A Foucault or other similar test will show that the zonal spherical aberration has been considerably reduced or even overcorrected. For the particular system shown in FIG. 1 the marginal spherical aberration is made more negative by moving element #1 toward the right and the zonal spherical aberration is made more positive by moving the third element toward the left. For the system shown in FIG. 1, lens element #3 is a negative two diopter spectacle lens and lens element #1 is a negative six diopter spectacle lens. The glass used in most spectacle lenses is very low dispersion and low refractive index. The low dispersion is mandatory so that in the process of correcting the spherical aberration as little as possible of the chromatic aberration is compensated. The low refractive index results in maximizing the spherical aberration (negative) for a given power; the longitudinal chromatic aberration is proportional to the power.

The invention is not limited to the embodiments described above but all changes and modifications thereof not constituting departures from the spirit and scope of the invention are intended to be covered by the following claims.

I claim:

1. In a focal isolation monochromator comprising:

first spherical lens means having one nearly planar surface, a central portion thereof being covered with an internally reflecting layer;

second spherical lens means having one nearly planar surface and positioned coaxially to the first lens means so that the planar surfaces of the first and second lens means face away from each other, the first and second lens means being movable relative to each other on their common axes;

a ring-shaped internally reflecting layer on the planar surface of the second lens;

a light source positioned outside of the space between the first and second lens means, the position of the source is at least approximately in the focal point of the first lens means for one of the wavelengths of the light of the source, so that the radiation from the first lens means to the second lens means is at least approximately collimated; and a diaphragm facing the nearly planar surface of the second lens, and having stationary position in a particular plane, thereby selecting light of a wavelength focused in that plane as monochromator output.

2. A focal isolation monochromator comprising:

a source of heterochromatic light providing such light along an axis;

first positive lens means having chromatic aberration and positioned on the axis to have one of its wavelength dependent focal points coincide with the source, to provide a collimated beam for the respective wavelength;

second positive lens and light redirecting means positioned on the axis to focus the collimated beam onto the axis in the space between the first and second lens means and in several spaced apart image points, differing by wavelength;

third lens and light redirecting means positioned to have the image points as established by the second lens and light redirecting means as object points so as to provide second images thereof outside of the space between the first and second lens means and away from the source, the third lens means exhibiting chromatic aberration, so that the second images have image distances variable with wavelength; and a diaphragm positioned in the region of the second images, to block essentially all radiation not focused to an image in the plane of the diaphragm.

3. A monochromator as set forth in claim 2, the third lens mean including a collimator lens having chromatic aberration to provide a second collimated beam from the light as focused for one wavelength by the second lens means, and further including a fourth lens structurally combined with the second lens means and movably positioned therewith and in relation to the first lens means.

4. A monochromator as set forth in claim 3, the collimator lens being structurally combined with the first lens means.

5. A monochromator as set forth in claim 3, the second and fourth lens means being structurally combined lens means in that a ring portion of the latter lens means serves as second lens means, and the remaining central portion defining the fourth lens means, the redirecting means of the second lens means being a ring-shaped reflector.

6. A monochromator as set forth in claim 5, the collimator lens being structurally combined with the first lens means forming second combined lens means, the redirecting means of the third lens means being a centrally located reflector at the collimator lens, the first lens means being a ring-shaped portion of the second combined lens means.

7. A monochromator as in claim 3, the second lens and redirecting means being movable on the axis, relative to the diaphragm.

8. A focal isolation monochromator, comprising:

a source of relatively heterochromatic light;

first lens means disposed in relation to the source to provide a beam of collimated light or near collimated light at least for one wavelength of the light;

second optical means including positive lens means exhibiting chromatic aberration and disposed in relation to the first lens means to receive the collimated light and focusing said light on an optical axis at image points distributed on the axis along a first direction of wavelength dependency;

third optical means including positive lens means also exhibiting chromatic aberration and disposed in relation to the second optical means to have said image points as object points, the positive lens means of the second optical means having its wavelength dependent focal points on the axis and distributed thereon opposite to the first direction as to wavelength dependency, the third optical means producing wavelength dependent images in several wavelength dependent planes on the axis; and a stationary diaphragm positioned in a plane on the axis, the second optical means being adjustable on the axis for adjustment of the relative position of the image points so that the image planes vary correspondingly in relation to and as to wavelength dependent coincidence with the plane of the diaphragm.

9. A monochromator as in claim 8, the positive lens means of the third optical means structurally combined with the first lens means, the first lens means having configuration of a ring lens.

References Cited
UNITED STATES PATENTS

| | | | |
|---|---|---|---|
| 2,866,374 | 12/1958 | Lewis et al. | 356—99 |
| 3,185,021 | 5/1965 | Thompson | 356—100 |
| 3,247,758 | 4/1966 | Turner | 356—101 |

RONALD L. WILBERT, Primary Examiner

V. P. McGRAW, Assistant Examiner